(12) United States Patent
Spörrer

(10) Patent No.: US 7,559,190 B2
(45) Date of Patent: Jul. 14, 2009

(54) CHAIN LINK AND CHAIN SLEEVE OF A CHAIN, AND METHOD FOR PRODUCING A CHAIN SLEEVE

(75) Inventor: Joachim Spörrer, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/880,096

(22) Filed: Jul. 18, 2007

(65) Prior Publication Data

US 2008/0047254 A1 Feb. 28, 2008

Related U.S. Application Data

(60) Provisional application No. 60/833,425, filed on Jul. 26, 2006.

(30) Foreign Application Priority Data

Jul. 21, 2006 (DE) .......... 10 2006 033 734

(51) Int. Cl.
*B21L 9/02* (2006.01)
(52) U.S. Cl. .................. 59/8; 59/4; 59/35.1
(58) Field of Classification Search .......... 59/4, 59/5, 7, 8, 35.1, 78; 474/206, 207, 209
See application file for complete search history.

(56) References Cited

U.S. PATENT DOCUMENTS

| | | | | | |
|---|---|---|---|---|---|
| 1,473,855 | A | * | 11/1923 | Herford et al. | 59/8 |
| 1,755,252 | A | * | 4/1930 | Goeser | 59/78 |
| 1,842,117 | A | * | 1/1932 | Renshaw | 59/8 |
| 1,965,145 | A | * | 7/1934 | Klaucke | 464/49 |
| 2,155,584 | A | * | 4/1939 | Bryant et al. | 59/35.1 |
| 3,231,069 | A | * | 1/1966 | Lanham | 474/207 |
| 3,365,246 | A | * | 1/1968 | Otis et al. | 474/207 |
| 3,426,522 | A | * | 2/1969 | Onulak | 59/8 |
| 3,969,889 | A | | 7/1976 | Araya | 59/8 |
| 4,729,754 | A | * | 3/1988 | Thuerman | 474/209 |
| 4,863,418 | A | * | 9/1989 | Fillar et al. | 474/207 |
| 5,468,376 | A | * | 11/1995 | Bates | 474/209 |
| 5,667,442 | A | * | 9/1997 | Tanaka | 59/5 |
| 5,745,974 | A | * | 5/1998 | Tanaka | 59/8 |

FOREIGN PATENT DOCUMENTS

| | | |
|---|---|---|
| DE | 38 09 841 C1 | 5/1989 |
| DE | 43 07 898 A1 | 9/1994 |
| EP | 1 342 651 A2 | 9/2003 |
| EP | 1 645 528 A1 | 4/2006 |
| FR | 1.485.808 | 6/1967 |
| GB | 2 216 833 A | 10/1989 |
| GB | 2 368 623 A | 5/2002 |

* cited by examiner

Primary Examiner—David B Jones
(74) Attorney, Agent, or Firm—Alfred J. Mangels

(57) ABSTRACT

A chain link for a roller chain or a sleeve-type chain that has a plurality of link plates with openings for receiving chain sleeves that can be brought into engagement with a sprocket wheel to transmit force. The chain sleeve has a central region that is engaged with the sprocket wheel and that has a larger outer diameter than its end regions that are held in the link plate openings. A method is disclosed for producing a chain sleeve for a chain link of a chain, which is produced by deep drawing, or by machining.

3 Claims, 1 Drawing Sheet

CHAIN LINK AND CHAIN SLEEVE OF A CHAIN, AND METHOD FOR PRODUCING A CHAIN SLEEVE

BACKGROUND OF THE INVENTION

1. Field of the Invention

The present invention relates to a chain link of a chain, in particular a roller chain or sleeve-type chain, having a plurality of link plates with openings for receiving chain sleeves. The sleeves can be brought into engagement with a sprocket wheel to transmit force, and the sprocket engagement region of the sleeve has a predetermined outer diameter. In addition, the invention relates to a chain sleeve for a chain link of a chain and having a substantially cylindrical shape. Furthermore, the present invention also relates to a method for producing a chain sleeve for a chain link of a chain.

2. Description of the Related Art

Chains, in particular roller chains and sleeve-type chains, are sufficiently known from the existing art. Each chain includes a plurality of chain links, which in turn have a plurality of link plates. The link plates include openings in which chain sleeves are received and are attached by pressing them into the opening of the link plate, for example. In that way, adjacent links of the chain are hingedly connected to each other.

It has been found that the known chains, in which the chain sleeves are pressed into the inner plates of the link plates, for example, require a relatively large bore as the opening for receiving or impressing the chain sleeves, which is matched to the outer diameter of the chain sleeves. The outer diameter of the known chain sleeves is determined by the region of the sleeve that is engaged with the sprocket wheel.

The relatively large opening in the link plate causes a reduction in the breaking strength of the link plate, because a large link plate opening reduces the remaining web region width between the opening and the outer periphery of the link plate. As a consequence, the maximum possible loading capacity of the chain is also reduced.

An object of the present invention is to improve a chain link, a chain sleeve, and a method for producing a chain sleeve of the type identified above, and in such a way that the strength of the link plates, and hence the strength of the chain as a whole, is increased.

SUMMARY OF THE INVENTION

The object is achieved in accordance with the present invention by a chain link of a chain, in particular a roller chain or sleeve-type chain having a plurality of link plates with openings for receiving chain sleeves that can be brought into engagement with a sprocket wheel to transmit force. The region of the chain sleeve that is engaged with the sprocket wheel has a certain outer diameter $D_2$ and the sleeve has a smaller outer diameter $D_1$ in its regions that are held in the associated link plate openings.

Thus the regions of the chain sleeves associated with the link plate openings are reduced in size in such a way that the strength of the link plate can be increased due to the smaller bores for the link plate openings. As a result, a chain sleeve with shoulders near both ends is realized. That advantageous design of the invention results, on the one hand, in the advantage that the strength of the link plate and of the chain as a whole is increased, while at the same time the dimensions of the chain remain the same, since in particular the region that is brought into engagement with the sprocket wheel has the same larger outer diameter, which is adapted to the sprocket wheel.

An advantageous embodiment of the invention includes the provision that the smaller outer diameter $D_1$ is provided on the end regions of the substantially cylindrical chain sleeve. It is also possible to conceive of other regions having that smaller outer diameter, but it has been found that as a rule the end regions are used for pressing into the respective link plate openings.

The problem that gives rise to the invention is also solved by a chain sleeve for a chain link of a chain, in particular for the previously-described chain link, which has a substantially cylindrical shape and in which a larger outer diameter $D_2$ is provided in the central region and a reduced outer diameter $D_1$ at the end regions of the cylindrical shape.

That proposed structural form of the chain sleeve, with shoulders on both ends, results in the advantages already set forth above, since the central region of the chain sleeve, which is normally brought into engagement with a sprocket wheel, has the usual outer diameter $D_2$. Only the end regions, which are associated with the openings in the link plates, have the smaller outer diameter $D_1$.

A possible refinement of the invention can provide that the transition zone between the larger outer diameter $D_2$ of the central region and the reduced outer diameter $D_1$ of the respective end regions of the chain sleeve is of continuous form. The strength of the chain sleeve in accordance with the invention can be increased through the design implementation of a continuously or constantly designed transition region, for example in the form of an incline or a curve.

The problem underlying the invention is also solved by a method for producing a chain sleeve for a chain link of a chain, in particular for a chain sleeve as described above, in which the chain sleeve is fabricated by a non-cutting method, preferably by means of deep drawing. Using deep-drawing technology results in a seamless form of the chain sleeve, so that certain defined diameters of the chain sleeve can be produced readily without the need for further processing.

A different embodiment of the method in accordance with the invention can provide for the proposed chain sleeve to be fabricated by machining. That means that any machine tool that works by cutting can be used to produce the chain sleeve. For example, the chain sleeve can be produced by turning, milling, or the like.

BRIEF DESCRIPTION OF THE DRAWING

The structure, operation, and advantages of the present invention will become further apparent upon consideration of the following description, taken in conjunction with the accompanying drawing in which.

DESCRIPTION OF THE PREFERRED EMBODIMENTS

Figure 1:
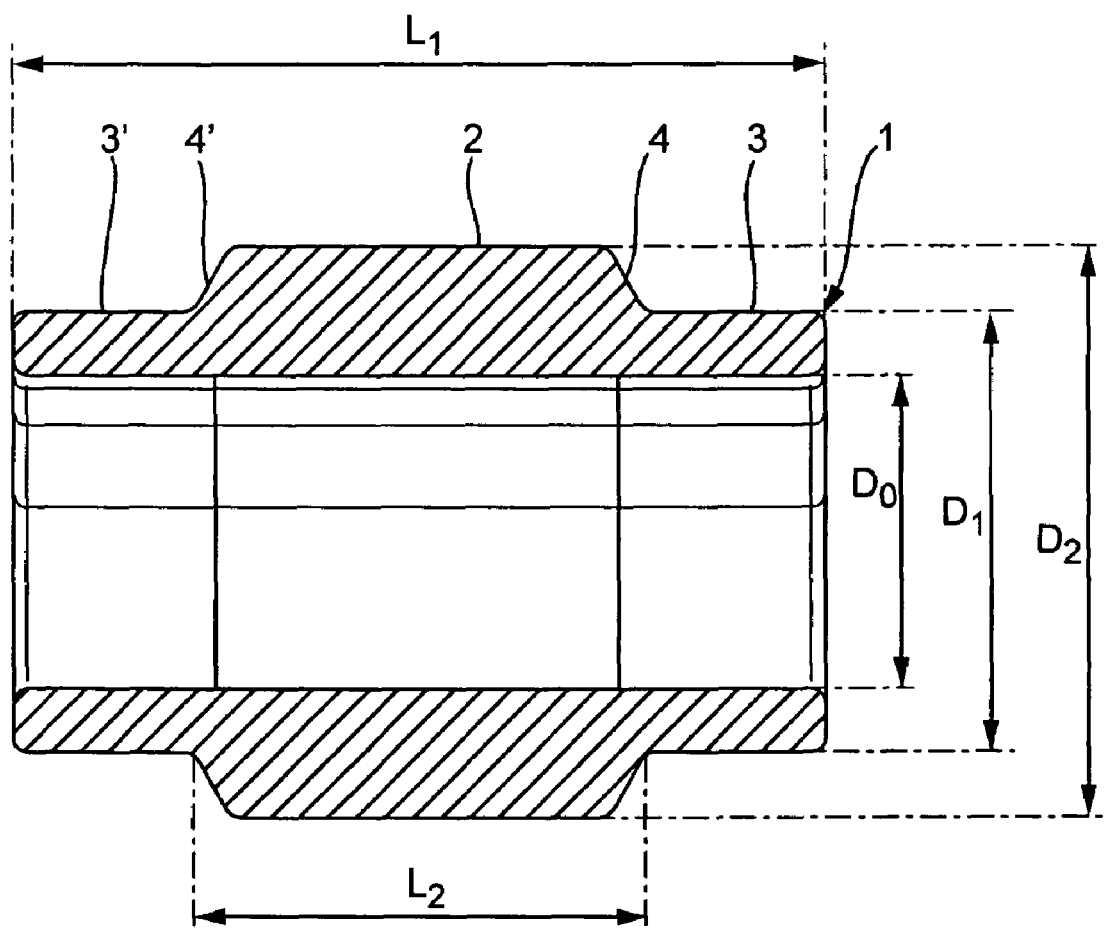
FIG. 1 is a longitudinal cross-sectional view of an embodiment of a chain sleeve in accordance with the present invention.

FIG. 1 shows a cross-sectional view of a possible embodiment of a chain sleeve in accordance with the invention. Chain sleeve 1 is normally pressed into an opening in a link plate of a chain, in particular an inner link plate, which is not shown in further detail.

Chain sleeve 1 has a substantially cylindrical shape with a predetermined inside diameter $D_0$ and a total length $L_0$. The shell of chain sleeve 1 in accordance with the invention has a central region 2 and end regions 3, 3'. Central region 2 has a length $L_2$, and serves to engage a sprocket wheel, which is engaged with the chain to transmit force. The end regions 3, 3' of chain sleeve 1 are each pressed into associated openings of inner link plates of a chain link; the link plates are not shown in further detail.

In accordance with the present invention provision is made for central region 2 of chain sleeve 1 to have an outer diameter $D_2$ and for end regions 3, 3' to have a smaller outer diameter $D_0$. That is especially advantageous, since the necessary diameter of the associated inner link plate openings can thus also be reduced, so that for the same link plate outer dimension the remaining residual wall width of each inner link plate is increased, so as to increase the strength of the inner link plates individually and hence of the chain as a whole.

A transition zone 4, 4' between the respective end regions 3, 3' and the central region 2 of chain sleeve 1 is designed as a zone of constantly decreasing or increasing outer diameter. Thus, an incline is provided as the transition zone 4, 4'. That makes the design of chain sleeve 1 in accordance with the invention more robust.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for producing a chain sleeve for a link of a chain having a plurality of link plates that include openings for receiving chain sleeves, said method comprising the steps of:

deep drawing a seamless cylindrical tube having a predetermined outer diameter and a predetermined inner diameter;

forming a reduced diameter outer end region at each end of the drawn tube while maintaining the predetermined inner diameter so that the drawn tube includes a central tubular region having a central region outer diameter and an outer tubular end region at each end of the central region, wherein each outer end region has an outer diameter that is smaller than the central region outer diameter; and forming transition zones between innermost ends of the outer end regions and respective outermost ends of the central region.

2. A method in accordance with claim 1, wherein the transition zones are defined by inclined outer surfaces that extend from the innermost ends of the outer end regions to the outermost ends of the central region.

3. A method in accordance with claim 1, wherein the transition zones are defined by respective curves that extend from the innermost ends of the outer end regions to the outermost ends of the central region.

* * * * *